United States Patent
Friis-Knudsen

(10) Patent No.: US 7,954,363 B2
(45) Date of Patent: Jun. 7, 2011

(54) METHOD AND A SYSTEM FOR DETECTION OF AN ENGINE FAULT

(75) Inventor: Ole Friis-Knudsen, Sydals (DK)

(73) Assignee: Danfoss A/S, Nordborg (DK)

(*) Notice: Subject to any disclaimer, the term of this patent is extended or adjusted under 35 U.S.C. 154(b) by 335 days.

(21) Appl. No.: 11/995,969

(22) PCT Filed: Jul. 13, 2006

(86) PCT No.: PCT/DK2006/000412
§ 371 (c)(1), (2), (4) Date: Jul. 30, 2008

(87) PCT Pub. No.: WO2007/009459
PCT Pub. Date: Jan. 25, 2007

(65) Prior Publication Data
US 2008/0282784 A1 Nov. 20, 2008

(30) Foreign Application Priority Data
Jul. 18, 2005 (DK) .................................. 2005 01061

(51) Int. Cl.
*G01M 15/00* (2006.01)
(52) U.S. Cl. .................................. 73/114.57; 73/114.01
(58) Field of Classification Search ............... 73/114.57, 73/114.01
See application file for complete search history.

(56) References Cited

U.S. PATENT DOCUMENTS

| | | | | |
|---|---|---|---|---|
| 3,754,538 A * | 8/1973 | Ephraim et al. | ........... | 123/41.86 |
| 4,719,792 A * | 1/1988 | Eriksson | ........................... | 73/47 |
| 5,101,781 A * | 4/1992 | Wolfe | ....................... | 123/198 D |
| 5,116,331 A * | 5/1992 | Chapman | ........................ | 73/721 |
| 5,792,949 A * | 8/1998 | Hewelt et al. | .............. | 73/114.01 |
| 6,123,061 A * | 9/2000 | Baker et al. | .................... | 123/573 |
| 6,484,586 B1 * | 11/2002 | Dutoit et al. | .................... | 73/722 |
| 6,910,383 B2 * | 6/2005 | Ou et al. | ......................... | 73/754 |
| 7,080,547 B2 * | 7/2006 | Beyer et al. | ................. | 73/114.37 |
| 7,370,923 B2 * | 5/2008 | Tanno et al. | ...................... | 347/7 |
| 2004/0118213 A1 * | 6/2004 | Ou et al. | ......................... | 73/754 |
| 2005/0022795 A1 * | 2/2005 | Beyer et al. | .................. | 123/516 |

FOREIGN PATENT DOCUMENTS

| | | |
|---|---|---|
| EP | 0 777 041 A2 | 6/1997 |
| FR | 2641575 | 7/1990 |
| JP | 4019312 | 1/1992 |

* cited by examiner

*Primary Examiner* — Freddie Kirkland, III
(74) *Attorney, Agent, or Firm* — McCormick, Paulding & Huber LLP

(57) ABSTRACT

An improved method for detection of engine faults especially suited for use on ships. The method is in particular related to the detection of a fault in an internal combustion engine having within the housing a crankshaft connected to a piston. The method includes determination of a pressure difference between the housing and the area outside the housing. If comparison of the pressure difference with a fault indicating pressure difference limit shows that the pressure difference is greater than the fault indication pressure difference limit then the presence of the fault is indicated. According to the method is in the pressure difference determined by comparing the pressure existing in the housing with the pressure of the area outside the housing, while attenuating pressure changes of the area outside the housing, so that pressure changes having a duration equal to or less than a defined fault characteristic period of time are supposed.

9 Claims, 2 Drawing Sheets

METHOD AND A SYSTEM FOR DETECTION OF AN ENGINE FAULT

CROSS REFERENCE TO RELATED APPLICATIONS

This application is entitled to the benefit of and incorporates by reference essential subject matter disclosed in International Patent Application No. PCT/DK2006/000412 filed on Jul. 13, 2006 and Danish Patent Application No. PA 2005 01061 filed Jul. 18, 2005.

FIELD OF THE INVENTION

The invention relates to a method and a system for detection of a fault in internal combustion engines. The method and the system are especially suited for detection of engine faults on ships.

BACKGROUND OF THE INVENTION

Engine crankcase explosions on ships happens a few times every year and since they regularly lead to the dead of engine personal and to large damages of the engine and the surrounding engine room, many efforts are made to avoid explosion. Crankcase explosions can occur when oil mist is formed inside the engine. Oil mist is highly explosive and can be ignited by a hot spot of the engine. If a component inside the engine runs hot lubricating oil on the component evaporates and condensates into small droplets in colder areas, hereby forming the aforementioned oil mist. The mist can be ignited by the same component creating the mist. When mist explosions happen inside the engine the resultant pressure wave can propagate large amounts of unburned oil outside the engine where it can be ignited by other sources and contribute further to the effects of the preceding explosion.

Oil mist detectors are used in the shipping industry to detect the existence of oil mist. However mist detectors suffer from a large number of false alarms and since the avoidance of further oil mist creation is remedied by reducing the engine load or stopping the engine, a ship will consequently have reduced manoeuvrability, which e.g. during harbour manoeuvring could lead to collisions. A reduction in the number of false alarms is therefore highly requested by the shipping industry. Further more are oil mist detectors relatively expensive.

Besides oil mist generating faults are also faults creating blow-by gas, which increase the pressure in the crankcase, forming part of the engine housing, detectable. Blow-by gases enter the crankcase through clearances around the piston rings.

EP777041 discloses a sensor for detection of blow-by gasses in an engine making it possible to evaluate the performance of an engine. The sensor combines a venturi with a differential pressure sensor. The pressure sensor receives inputs from two positions in the venture and based on the pressure difference is the performance of the engine evaluated.

A different approach for detection of faults generating increased pressure in the engine housing is disclosed in FR2641575. Here is a manometer with a photo detection system is used. One side to the manometer is connected to the engine housing, while the other side is connected to the engine room atmosphere. Between the two tube legs of the manometer is a flow restriction to avoid up and down movement of manometer fluid caused by the rocking of a ship. When then pressure difference reaches a certain limit detected by the photo detection system this is considered to indicated an upcoming engine fault. More or less similar systems are disclosed in NL6600131 and JP4019312. These systems have not gained a wide spread use within the shipping industry. One reason could be that they are prone to false alarms. False alarms will be generated when the pressure in the engine room falls. This will be detected as an increased pressure differential, but will generally not be cause by engine faults. Such pressure drops will happen, when an access entry to the engine room fx. a door, is opened, because the pressure in the engine room is higher than the atmospheric pressure present in the rest of a ship. Higher pressure is present because the turbocharger of the engine takes air from the engine room and to ensure sufficient air in the room air is blow into the room.

SUMMARY OF THE INVENTION

The object of the invention is therefore to provide an improved method for detection of engine faults, especially suitable for use on ships.

According to the invented method is the pressure difference determined by comparing the pressure existing in the housing with the pressure of the area outside the housing, while attenuating pressure changes of the area outside the housing, so that pressure changes having a duration equal to or less than the fault characteristic period of time are suppressed. A variety of engine faults will during a period equal to or less than the fault characteristic period of time increase the pressure to a predetermined level within the engine housing. These periods are in most cases less than 30 seconds e.g. 5 to 10 seconds. The duration of these periods are in some cases the same as the duration of pressure drops occurring in an area outside the housing e.g. the engine room surrounding the engine. Such pressure drops in the engine room could as mentioned above be generated by the opening of the access door to the engine room. If the pressure difference increases beyond the fault indicating pressure difference and there is no attenuation of pressure changes occurring outside the housing, will it not be possible to differentiate between engine faults demanding action and harmless events like the opening of the access door into the engine room. Both events would then lead to an alarm, which often would be a false alarm. But by attenuating pressure changes having a duration equal to or less than the fault characteristic period of time in the area outside the engine housing, pressure drops such as those created by the opening of an access door to the engine room are then suppressed and as a result will the door opening not generate a false alarm. By detecting according the method the number of false alarms are reduced, whereby improved fault detection is achieved.

A majority of faults generating the predetermined pressure increase within the engine housing generates the pressure increase within 30 seconds and therefore is it sufficient to suppress pressure changes having a duration equal to or less than this period of time.

If pressure changes, having duration up to three times the fault characteristic period, are suppressed, a higher degree of reliability is achieved.

If the engine revolutions are reduced when the pressure difference is greater than the fault indicating pressure difference limit further damages created by the fault can be prevented or at least reduced. The same consideration applies if the engine is stopped in this situation.

Another aspect of the invention is to provide an improve system for detection of faults. This is achieved by connecting the area outside the engine housing to the second inlet through an attenuating arrangement suppressing pressure changes.

By providing an attenuating arrangement suppressing pressure changes having a duration being equal to or less than the fault characteristic period of time are those pressure changes causing false alarms, prevented from reaching the pressure determining arrangement.

The use of a silicone chip based pressure sensor makes the system insensitive to the rocking of the ship. Furthermore are these sensors cheap and have sufficient precision.

If the attenuating arrangement includes an air permeable membrane one can achieve a precise control of the attenuation of a pressure change occurring in the area outside the housing, because the mechanical dimensions of the membrane, such as thickness and pore size, determining the attenuating properties of the membrane, can be controlled to a high degree. An air permeable membrane can be produced from polytetrafluorethylene (PTFE) or fluoroethylene-propylenene (FEP).

BRIEF DESCRIPTION OF THE DRAWINGS

In the following is a preferred embodiment of the invention described, with reference to the figures where.

DETAILED DESCRIPTION OF THE INVENTION

Figure 1:
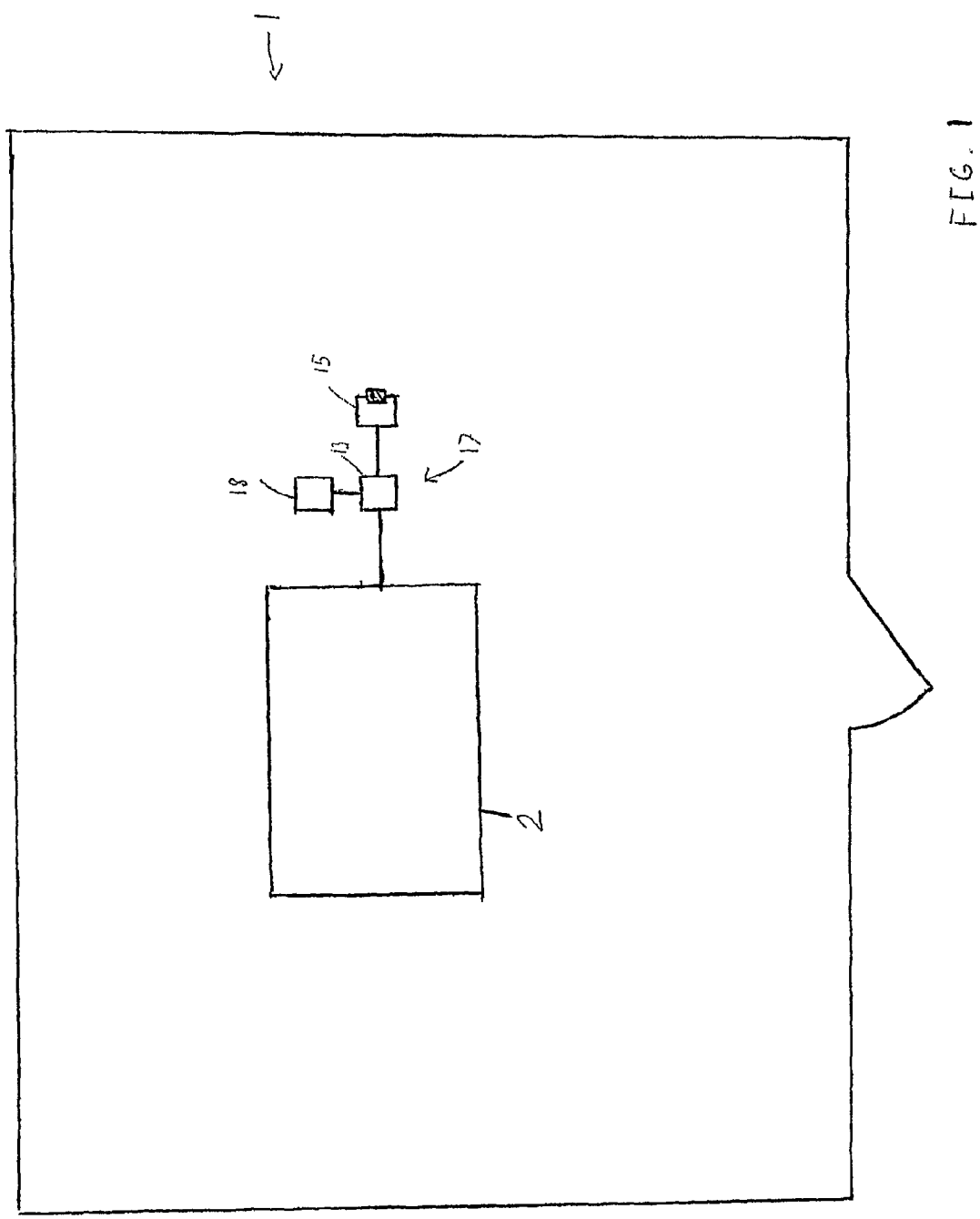
FIG. 1 shows the outline of an engine room in a ship.
Figure 2:
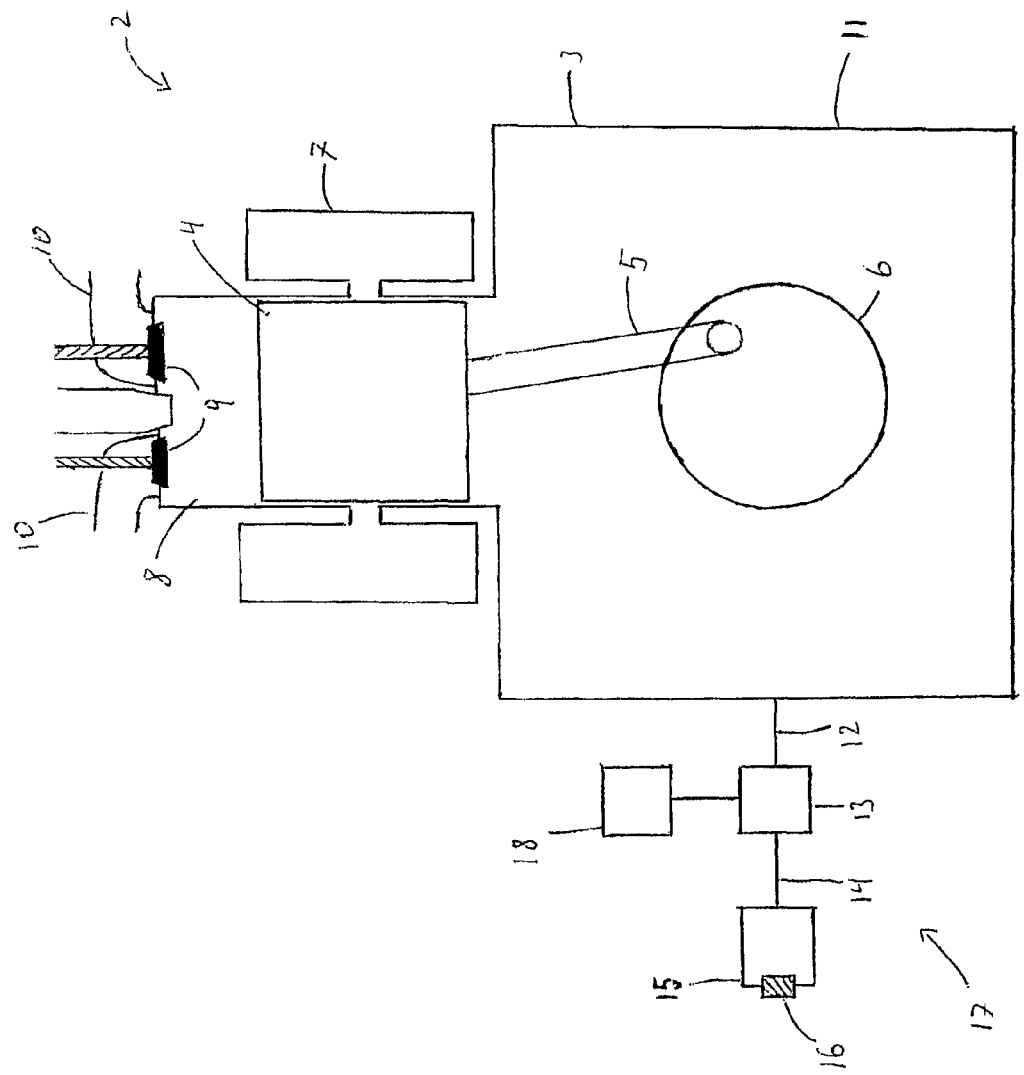
FIG. 2 shows a cross sectional view of a two-stroke diesel engine with the invented fault detection system.

The engine room 1 of FIG. 1 comprises an internal combustion engine 2, in particular a two-stroke diesel engine. The details of the engine are disclosed in FIG. 2. The engine 2 comprises an engine housing 3. Part of the housing is formed by the crank case 11. Within the housing 3 is at least one, typically a multitude of pistons 4 arranged to reciprocate in cylinders 5. The pistons are through connecting rods 5 connected to a crankshaft 6, in an arrangement through which the reciprocating movement of the pistons are converted into a rotation of the crankshaft 6. The crankshaft 6 is connected to a ship propeller (not shown) generating the driving force of the ship. The reciprocating movement of the piston is created by combustion of diesel fuel injected in a combustion chamber 8 formed above the piston through a fuel injector. The air for the combustion process is provided via an air intake 7 connected to a turbocharger (not shown) and the exhaust gasses of the combustion process are removed from the chamber 8 by passing through exhaust valves 9 into exhaust outlets 10.

The engine is monitored by a system for detection of an engine fault. The system comprises a differential pressure determining arrangement 17 having a differential pressure sensor 13 e.g. a silicone chip based sensor, and a monitoring unit 18. A first inlet 12 of a differential pressure determining arrangement 17 is in fluid communication with the interior of the engine housing, so that pressure present in the housing can propagate through the first inlet 12. A second inlet 14 of the arrangement 17 is in fluid communication with the engine room via a throttle, forming part of a pressure pulsation attenuating arrangement 15, working in much the same way as a low pass filter, know from the electronic field. An air permeable membrane 16 preferably forms the throttle; such a membrane could be made from polytetrafluorethylene (PTFE) or fluoroethylene-propylene (FEP). Membranes formed in these materials can be provided with the right throttling characteristics by varying their thickness and pore size. One further advantage is that the throttling characteristics are not significantly affected by oil or grease always being present in an engine room. Another way of forming the throttle is to provide a drilling with a small cross section and a predefined length in the fluid communication between engine room and sensor e.g. in the inlet of the differential pressure determining arrangement. By varying the length and the cross section one can control the throttling characteristics of the throttle. However such a throttle would be more sensitive to oil, as the oil could enter the drilling and thereby significantly interfere with the fluid communication between sensor and engine room. The differential pressure determining arrangement will generate a signal representative of the pressure difference between the pressure in the housing and the pressure of an area outside the housing. The monitoring unit processes this signal. The unit will if the pressure difference increases above a fault indicating pressure difference limit, indicate the presence of an engine fault, e.g. by giving an alarm to the engine crew. The crew will then be able to take the necessary steps to so that damages created by the fault can be prevented or at least reduced. These steps could include a reduction of the engine revolutions or stopping the engine. These steps could however also be initiated automatically by the monitoring unit.

When the engine runs, the turbocharger takes air from the engine room and air is therefore constantly blow into the room to ensure that sufficient air is present. This creates a slight overpressure in the room. The overpressure is in the order of 100 mBar. To provide access to the substantially closed engine room is it equipped with an entry door. When the door opens the pressure in the room is diminished as the areas of the ship out side the engine room are at atmospheric pressure. The pressure will start dropping as soon as the door is opened and will continue until pressure in engine room equals the atmospheric pressure or the door is closed. The opening and closing of the engine room door will typically take a few seconds and the pressure will therefore drop during a corresponding period.

Most sudden engine faults creating a pressure increase in the engine housing will create a predetermined pressure increase over a period of up to 30 seconds; some faults create the pressure increase within 5 to 10 second, some even faster.

Both events will if they do not occur simultaneously causes a fault alarm if the attenuating arrangement was not present, because they both will lead to an increased pressure difference between the engine housing and the engine room. However since the differential pressure determining arrangement is provided with an attenuating arrangement it is possible to differentiate between pressure changes occurring in the engine room and those occurring in the engine housing. The differentiating capability of the invented system significantly increases the reliability of the system.

In the above is the pressure difference between the pressure in the engine housing and the pressure in the engine room used to detect an engine fault. This is the case because the engine room serves as a reference for pressure in the engine housing. The pressure will over a period of time being many times (several minutes) longer than the fault characteristic period adjust it self to pressure being present in engine room, however if the pressure in the engine housing adjusts it self to a different reference, this reference is chosen instead of the pressure in the engine room.

The differential pressure determining arrangement could in principle also be realized by providing two absolute pressure sensors in the arrangement. The pressure in each area measured by a absolute pressure sensor The two measurements could then be subtracted and the differential pressure is determined. However an absolute pressure sensor is expensive and two of them would be needed to achieve a differential pressure. The use of two absolute pressure sensors would further more provide a differential pressure measurement with a higher uncertainty.

The system may be combined with other fault detection system already present on a ship, e.g. a system detecting the temperature of engine bearings.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A method for detecting a fault in an internal combustion engine having within a housing a crankshaft connected to a piston; the fault generating a predetermined pressure increase in the housing within a fault characteristic period of time; the method comprising the following steps:
    providing a differential pressure sensor operatively connected through a throttle with the outside of the housing, the differential pressure sensor is also connected with the inside of the housing;
    determining a pressure difference between the pressure in the housing and the pressure of an area outside the housing;
    comparing said pressure difference with a fault indicating pressure difference limit and indicating the presence of a fault, if the pressure difference is greater than the fault indicating pressure difference limit, wherein
the pressure difference is determined by comparing the pressure existing in the housing with the pressure, after pressure changes are attenuated by the throttle, of the area outside the housing, said pressure changes of the area outside the housing are attenuated so that pressure changes having a duration equal to or less than the fault characteristic period of time are suppressed.

2. The method according to claim 1, wherein the fault characteristic period is 30 seconds.

3. The method according to claim 1 also comprising the step of reducing the engine revolutions, when the pressure difference is greater than the fault indicating pressure difference limit.

4. The method according to claim 1 also comprising the step of stopping the engine, when the pressure difference is greater than the fault indicating pressure difference limit.

5. A system for detection of a fault in an internal combustion engine having within a housing a crankshaft connected to a piston; the fault generating a predetermined pressure increase in the interior of the housing within a fault characteristic period of time; the system comprising a differential pressure determining arrangement having a first pressure inlet being connected to the interior of the housing and a second pressure inlet being connected to an area outside the engine housing; the system determines the pressure difference between the pressure present in the interior of the housing and the pressure present in the area outside the housing and compares the determined pressure difference with a fault indicating pressure difference limit and indicates the presence of a fault, if the pressure difference is greater than the fault indicating pressure difference limit, wherein the area outside the engine housing is connected to the second inlet through an attenuating arrangement suppressing pressure changes, the attenuating arrangement including a throttle.

6. The system according to claim 5, wherein the attenuating arrangement suppresses pressure changes having a duration being equal to or less than the fault characteristic period of time.

7. The system according to claim 5, wherein the differential pressure determining arrangement comprises a silicone chip based differential pressure sensor.

8. The system according to claim 5, wherein the throttle is an air permeable membrane.

9. The system according to claim 6, wherein the membrane is a polytetrafluorethylene (PTFE) membrane or a fluoroethylene-propylene (FEP) membrane.

* * * * *